United States Patent
Haff et al.

[11] 3,763,851
[45] Oct. 9, 1973

[54] ULTRASONIC DOPPLER FETAL HEART MONITOR WITH VARIABLE RESONANCE MEANS

[75] Inventors: Richard Walter Haff, Willingboro; Fred Louis Hatke, Skillman, both of N.J.

[73] Assignee: Hoffmann-La Roche Inc., Nutley, N.J.

[22] Filed: Dec. 8, 1971

[21] Appl. No.: 205,942

[52] U.S. Cl. ......... 128/2.05 Z, 73/67.7, 128/2.05 T
[51] Int. Cl. .............................................. A61b 5/02
[58] Field of Search ............... 128/2 R, 2 V, 2.05 P, 128/2.05 R, 2.05 S, 2.05 T, 2.06 A, 2.06 F, 2.06 R; 73/67.6 R, 67.7, 67.8 R, 194 A

[56] References Cited
UNITED STATES PATENTS

| | | | |
|---|---|---|---|
| 2,800,789 | 7/1957 | Henry | 73/67.8 |
| 2,921,465 | 1/1960 | Cook | 73/67.8 |
| 3,321,959 | 5/1967 | Wood et al. | 73/67.7 |
| 3,431,551 | 3/1969 | Rollwitz et al. | 73/67.8 |
| 3,498,290 | 3/1970 | Shaw et al. | 73/194 A |
| 3,561,430 | 2/1971 | Filler, Jr. et al. | 128/2.05 T |
| 3,568,661 | 3/1971 | Franklin | 73/67.6 |

Primary Examiner—William E. Kamm
Attorney—Samuel L. Welt et al.

[57] ABSTRACT

Ultrasonic apparatus for monitoring heartbeat activity from Doppler shifted information derived from heartbeat motion comprising deriving the Doppler shifted information, which is fed to an adjustable resonant circuit for de-emphasizing Doppler signal frequency content other than that about the resonant circuit frequency, and comparing input signals to and output signals from the resonant circuit for detecting a phase difference, if any, which is employed for adjusting the frequency of the resonant circuit at a preselected rate.

11 Claims, 3 Drawing Figures

ULTRASONIC DOPPLER FETAL HEART MONITOR WITH VARIABLE RESONANCE MEANS

BACKGROUND OF THE INVENTION

The present invention relates generally to electrical signal processing techniques utilized with an ultrasonic exploratory system and, more particularly, to signal analyzing in fetal monitoring.

In ultrasound exploratory scanning, physiological data is derived from a patient, for monitoring and/or therapeutic purposes, by transmitting ultrasonic energy into the patient's body and then collecting and processing the data derived, in the form of an intelligence, for diagnostic purposes. However, problems are often incurred in analyzing such data due to the signals derived from the multiple sounds and associated noise, collected from the body site being investigated.

In particular, in the field of fetal monitoring, the frequent movement of the fetus adds to the problem of deriving reliable signals indicative of fetal heart rate. The problem is intensified even more as a consequence of the multiple sounds generated by the front and rear wall of the heart, heart valves, etc., in addition to the nonsynchronous impulse noise caused by the fetal and mother movements. Naturally, processing of multiple signals with background noise within a single heartbeat, if processed as consecutive heartbeat signals, would produce a false indication of the fetal heart rate, and therefore provide unreliable instrumentation. Further, the diagnpsis resulting from such indications may even cause the omission of emergency procedures in some cases, and the commision of unwarranted emergency procedures in others.

SUMMARY OF THE INVENTION

Accordingly, it is the purpose of the present invention to obviate the problems noted above by suppression of and/or elimination of signals indicative of other motions within the body and nonsynchronous impulse noise. The latter is accomplished by the provision of processing circuitry which includes a phase locked tracking filter for the suppression of and/or elimination of such undesired signals, which filter is conditioned by a continuous comparison of the incoming signals to the filter with the filter output to detect the phase shift between the tracking filter output and its incoming signal and modify the filter setting accordingly.

DESCRIPTION OF THE PREFERRED EMBODIMENT

Figure 1:
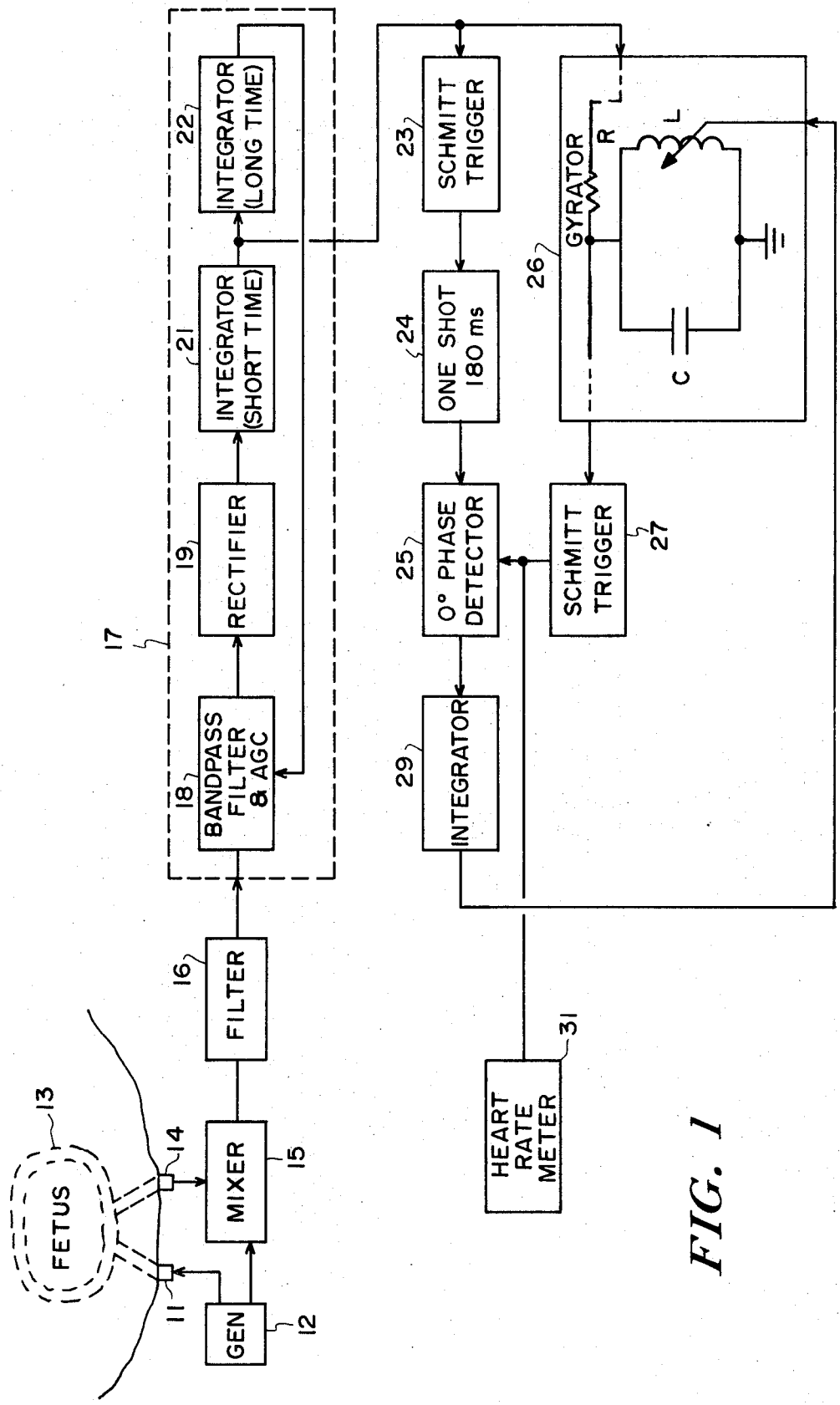
FIG. 1 is a block diagram of an ultrasonic scanning system according to a preferred embodiment of the invention.

Referring to FIG. 1, there is shown a transmitting transducer 11 driven by a generator 12 for transmitting ultrasonic energy to a fetus roughly illustrated as 13 within the maternal abdomen. The ultrasonic energy generated, to be transmitted through the body, may be of the pulsed wave or continuous wave type. A receiving transducer 14 adapted for deriving electrical impulse signals responds to the ultrasonic signals returned from the fetus 13. The receiving transducer 14 is connected to a mixer 15. Mixer 15 which is also connected from generator 12, amplifies both incoming signals and mixes them to provide a resultant Doppler signal output. The Doppler signals have a frequency proportional to the velocity of the target.

As was previously indicated, the output of the mixing unit 15 comprises a waveform complex which includes a multitude of signals including signals bearing information indicative of the front and back motion of the heart wall, cardiac valve motion, movement of the fetus, movements effected by the mother as well as background noise. The output signals from mixer 15 might be first restricted by a bandpass filter 16 to a frequency range such as between 100 Hz and 400 Hz. This signal could be connected to an audio amplifier (not shown) for driving earphones or a recorder, as desired.

The output of the mixer 15 in the illustrated embodiment is fed to a signal conditioner 17 including a bandpass filter 18 from approximately 105 Hz to 145 Hz which also acts as an automatic gain control unit. The filter 18 connected to a full wave rectifier 19 for rectification purposes to provide a unidirectional signal output. An integrator 21 having a relatively short time constant is connected from rectifier 19 to serve as an envelope detector. Integrator 21 is connected to a long time integrator 22 which in turn is connected back in a feedback fashion through the AGC unit 18 for gain control to provide output pulses of uniform amplitude, from filter 18.

The short time integrator 22 providing an output signal from signal conditioner 17, is connected to a Schmitt trigger unit 23 for squaring off the envelope detected signal representing short bursts of information in the bandpass region between 105 and 145 Hz. A 180 ms. one shot 24, equivalent to approximately 5 ½ heartbeats per second is connected from Schmitt trigger 23 to overshadow or smooth over, to some extent, occurrence of double beats or other interfering noise following on the heels of an immediately previous signal burst. The period of one shot 24 should not exceed the time for a maximum frequency limit of seven beats per second. One shot unit 24 in turn is connected to a zero degree phase detector 25.

Figure 2:
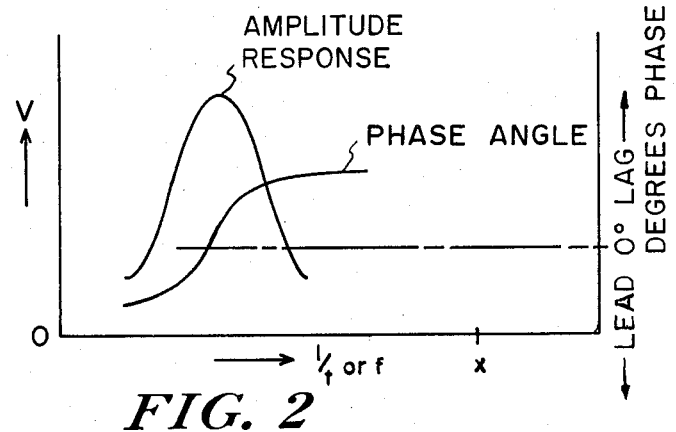
FIG. 2 is a voltage versus frequency time graph showing the electrical characteristics of the gyrator 26 shown in FIG. 1.

With reference back to short time integrator 21, it is noted that this unit is also connected to a gyrator filter 26, comprising a tunable parallel resonant circuit having an inductance L a capacitance C and resistance R. whereby the inductance L is variable. The electrical characteristics of the gyrator are illustrated in FIG. 2. Assuming at the input to the tuned circuit, a signal of zero phase and constant amplitude is applied, then, as the input frequency is varied from zero to x cycles, the output will have a response cxaracteristic of the amplitude and phase angle waveforms shown. In the present embodiment, the resonant circuit is electronically tuned from 0.5 Hz to 4 Hz (equivalent to: 30 beats per minute to 240 beats per minute). The resonant circuit or gyrator 26 acts as a narrowband filter locking on to the fundamental frequency of the input. Gyrator 26 is, in turn, connected to a Schmitt trigger 27 which in turn is connected to a second input of the phase detector 25. The phase detector output is coupled through an integrator 29 back to the gyrator filter 26 to adjust the variable inductance L, for returning the gyrator 26. The output signal displayed on the heart rate meter 31 is derived from the Schmitt trigger 27 output.

OPERATION

Figure 3:
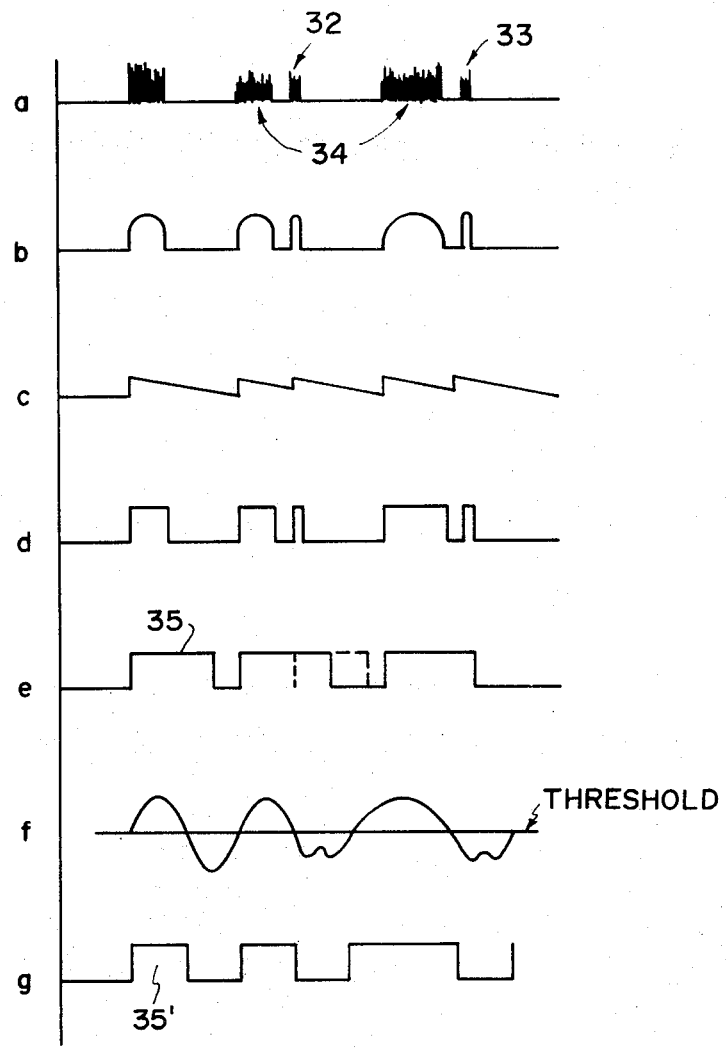
FIG. 3 is a waveform diagram showing the output characteristic of a tuned circuit with a varying frequency input signal to the system illustrated in FIG. 1.

In operation, with reference to FIGS. 1 and 3, a uniform level unidirectional output signal is derived from filter and AGC unit 18 rectifier 19, as shown in FIG. 3a, through use of the long time integrator 22 feedback.

For expediency, assume signals 32 and 33 at FIG. 4a are generated by the heart valves, or fetus movement and the signals 34 are indicative of the heart rate. As is shown at FIG. 4e the "noise" impulses 32 and 33 are absent at the first input to the phase detector 25 due to one shot 24. Gyrator 24 on the other hand is adapted to respond strongly to its input signal in terms of voltage amplitude at one desired frequency and discriminate against other frequencies, whereby the desired or tuned frequency is that which the gyrator is adjusted to, over for example, three to ten seconds (the slew rate of the gyrator) which is the time it might take for the gyrator to be returned from 0.5 to 4 Hz. In essence then, although the heartbeat may comprise several sounds, in effect having two or more sets of signal frequencies (e.g. 32, 33), the filter will lock on to the lowest frequency signal to de-emphasize the higher harmonic signal. This may be best illustrated with respect to FIG. 4f where it is shown that waveform portions representative of the frequency bursts 32, 33 which shortly follow the preceding frequency bursts 34, are de-emphasized by the gyrator. By employing a predetermined threshold level to energize Schmitt trigger 27, signals 32, 33 are eliminated at the Schmitt trigger 27 output which is fed to phase detector 25.

Assuming that the gyrator circuit is tuned to the precise frequency as the input signal, the phase shift through the circuit at phase detector 25 will be zero. This may be illustrated by comparing the leading edges of waveforms 35 and 35' at FIGS. 4e and g respectively. If the frequency of the tuned resonant circuit is either above or below the incoming frequency, the phase shift sensed by phase detector 25 is used as an error correcting signal via integrator 29 to retune the gyrator 26 to be precisely in tune with the incoming signal. The output of the integrator acts as the control voltage which determines the slew rate of the gyrator. The slew rate is made to be above the lowest period of the gyrator, which in the present embodiment, is indicated as being 2 seconds or ½ cycle/second. Clearly, the slew rate should not exceed a value that would not closely follow or track the actual incoming cardiac activity to which the filter is responding.

The gyrator is then, in effect, forced to track the incoming signal, whereby the slewing rate of the gyrator is limited by integrator 29 in a manner heretofor discussed. In summary then, the tuned resonant filter output will not respond to impulse artifact or even two, three or four motions per fetal cardiac cycle unless these motions are precisely harmonically related (equal time intervals). It should be noted that, if desired, the slew rate response to double beats (which provide a frequency increase) can be slower than the slew rate response to a decrease in frequency as sensed by the phase detector.

We claim:

1. Ultrasonic apparatus for monitoring heartbeat activity from Doppler shifted information derived from heartbeat motion comprising:

means for deriving said ultrasonic Doppler shifted information and generating electrical Doppler signals;

resonant circuit means including adjustable reactance means, coupled from said deriving means for de-emphasizing Doppler signal frequency content other than that about the resonant circuit frequency;

comparator means for detecting a phase shift between input signals to and output signals from the resonant circuit means and adjusting the reactance means at a preselected rate and in accordance with the detected phase shift; and means coupled from said resonant circuit means for displaying heartbeat activity.

2. Apparatus according to claim 1 wherein,
   said resonant circuit means includes gyrator means having a variable inductance automatically adjusted in accordance with the detected phase shift output of said comparator means.

3. Apparatus according to claim 1 wherein, said comparator means includes:
   phase detector means for detecting a phase shift difference; and,
   integrator means connected from said comparator means, for providing the preselected slewing rate at which said resonant circuit means is made to track a signal input applied thereto.

4. Apparatus according to claim 3 including:
   first shaper means connected to said comparator means for shaping the Doppler signals and providing pulses of uniform width not to exceed a maximum frequency limit of seven beats per second; and,
   second shaper means preceding said comparator means for shaping output signals from the resonant circuit means.

5. Apparatus according to claim 4 wherein:
   said second shaper means includes threshold meas for providing an output signal upon the output of said resonant circuit means exceeding a predetermined threshold potential.

6. Apparatus according to claim 1, including:
   amplifier means connected from said deriving means for automatically maintaining the gain of said Doppler signals at a uniform level.

7. Apparatus according to claim 1 including:
   bandpass filter means for passing from said deriving means Doppler signals occurring in a selected frequency range.

8. Apparatus according to claim 1 wherein,
   said tuned resonant circuit is adjustable for resonance to a fundamental frequency within the range of, at least, from 0.5 Hz to 4 Hz.

9. Ultrasonic apparatus for detecting fetal heart signals by monitoring ultrasonic Doppler shifted information received from the fetal site comprising:
   means for deriving said ultrasonic Doppler shifted information and generating electrical Doppler signals;
   means for conditioning said Doppler signals to provide output Doppler signals of uniform amplitude and in a selected frequency range;
   resonant circuit means including adjustable reactance means, connected from said conditioning means for passing Doppler signals about the resonant circuit frequency which exceed a predetermined threshold level;

comparator means for detecting a phase shift between Doppler signals passed by said conditioning means and resonant circuit means, to adjust the reactance means at a preselected rate and in accordance with the detected phase shift; and means coupled from said resonant circuit means for displaying heartbeat activity.

10. Ultrasonic apparatus according to claim 9 wherein, said resonant circuit means includes gyrator means having a variable inductance automatically adjusted in accordance with the detected phase shift output of the comparator means.

11. Ultrasonic apparatus according to claim 9 wherein, integrator means connected from said comparator means, for providing the preselected slewing rate at which said resonant circuit means is made to track a signal input applied thereto.

* * * * *